United States Patent
Horie et al.

(10) Patent No.: US 7,379,288 B2
(45) Date of Patent: May 27, 2008

(54) MONOLITHIC CERAMIC ELECTRONIC COMPONENT AND METHOD FOR MANUFACTURING THE SAME

(75) Inventors: Shigeyuki Horie, Fukui-ken (JP); Tomohiro Dozen, Okayama (JP); Takashi Noji, Echizen (JP); Tatsuo Furusawa, Sabae (JP); Takaaki Kawai, Echizen (JP)

(73) Assignee: Murata Manufacturing Co., Ltd. (JP)

( * ) Notice: Subject to any disclaimer, the term of this patent is extended or adjusted under 35 U.S.C. 154(b) by 89 days.

(21) Appl. No.: 10/565,168

(22) PCT Filed: Feb. 1, 2005

(86) PCT No.: PCT/JP2005/001418

§ 371 (c)(1),
(2), (4) Date: Jan. 19, 2006

(87) PCT Pub. No.: WO2005/083727

PCT Pub. Date: Sep. 9, 2005

(65) Prior Publication Data
US 2007/0109718 A1    May 17, 2007

(30) Foreign Application Priority Data
Feb. 27, 2004    (JP)    .............................. 2004-054807

(51) Int. Cl.
*H01G 4/06*    (2006.01)
(52) U.S. Cl. ............................ 361/321.1; 361/321.2; 361/306.1; 361/306.3; 361/311; 361/313
(58) Field of Classification Search ............ 361/321.1, 361/321.2, 321.3, 311–313, 306.1, 306.3, 361/321.4, 321.5, 302–305
See application file for complete search history.

(56) References Cited

U.S. PATENT DOCUMENTS 5,561,587 A * 10/1996 Sanada .................... 361/306.1

(Continued)

FOREIGN PATENT DOCUMENTS

JP        8-37127      2/1996

(Continued)

OTHER PUBLICATIONS

International Search Report mailed May 24, 2005 Written Opinion of the International Searching Authority mailed May 24, 2005.

*Primary Examiner*—Nguyen T Ha
(74) *Attorney, Agent, or Firm*—Dickstein, Shapiro, LLP.

(57) ABSTRACT

The monolithic ceramic electronic component includes a first external electrode 5, a second external electrode 6, and a ceramic sintered compact 4 including internal electrodes 2 and 3, the first and second external electrodes 5 and 6 being disposed on both end faces 4a and 4b of the ceramic sintered compact 4. The first and second external electrodes 5 and 6 have a multilayer structure in which sintered electrode layers 5a and 6a, intermediate electroplated layers 5b and 6b, and plated layers 5c and 6c are arranged in that order. Exposed surface regions 7a of insulating oxides 7 are exposed from the outer faces of the sintered electrode layers 5a and 6a, the oxides 7 being derived from a glass frit contained in the sintered electrode layers. Metals 8 are deposited on the exposed surface regions 7a and the intermediate electroplated layers 5b and 6b are then formed by electroplating.

18 Claims, 2 Drawing Sheets

U.S. PATENT DOCUMENTS 5,877,934 A * 3/1999 Sano et al. .................. 361/312
6,160,472 A * 12/2000 Arashi et al. .................. 338/21
6,185,087 B1 * 2/2001 Park et al. ............... 361/321.4
6,400,553 B2 * 6/2002 Yoshii et al. ............ 361/321.2

FOREIGN PATENT DOCUMENTS

| | | |
|---|---|---|
| JP | 8-97075 | 4/1996 |
| JP | 8-203770 | 8/1996 |
| JP | 2001-200163 | 7/2001 |
| JP | 2002-075779 | 3/2002 |
| JP | 2003-117804 | 4/2003 |

* cited by examiner

FIG. 1 (a)
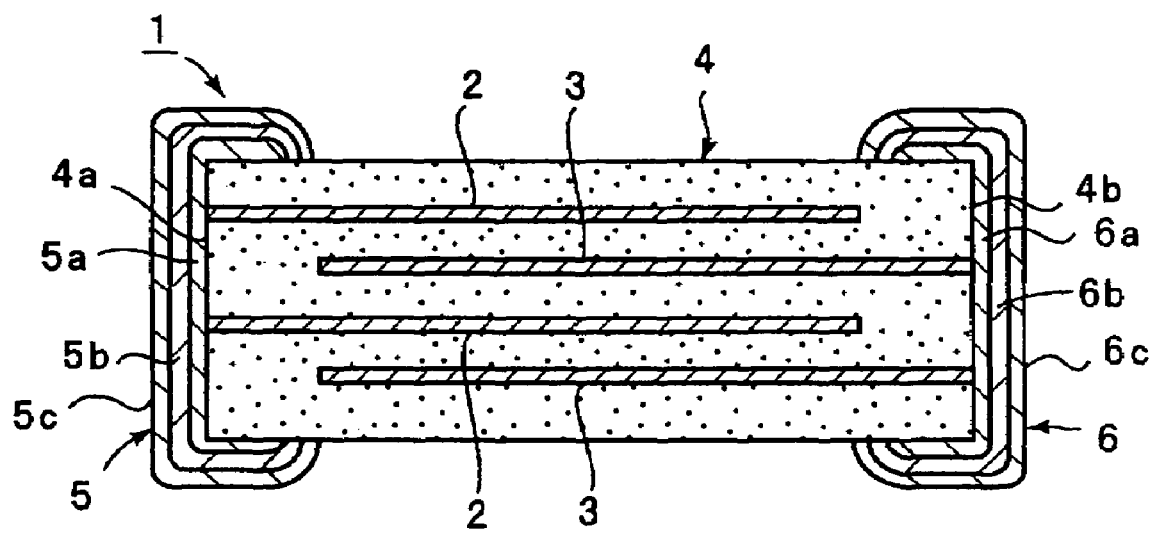
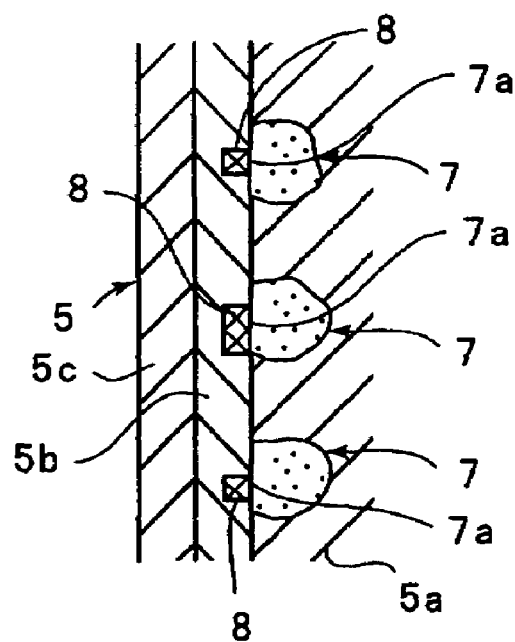
FIG. 1 (b)

MONOLITHIC CERAMIC ELECTRONIC COMPONENT AND METHOD FOR MANUFACTURING THE SAME

TECHNICAL FIELD

The present invention relates to monolithic ceramic electronic components such as monolithic capacitors and methods for manufacturing such components. The present invention particularly relates to a monolithic ceramic electronic component including external electrodes having a configuration in which an electroplated layer is disposed on a sintered electrode layer and also relates to a method for manufacturing such a component.

BACKGROUND ART

Known monolithic ceramic electronic components such as monolithic ceramic capacitors have a configuration in which a plurality of plated layers are arranged on a sintered electrode layer. In a known technique disclosed in, for example, Patent Document 1 cited below, an intermediate electroplated layer made of, for example, Ni is disposed on a sintered electrode layer having a certain thickness and a plated layer made of Sn or a Sn alloy is disposed on the intermediate electroplated layer. This is because the plated layer made of Sn or a Sn alloy is enhanced in solderability and the intermediate electroplated layer is useful in preventing the oxidation and solder erosion of the sintered electrode layer.

It is known that various properties of a monolithic ceramic capacitor are deteriorated if a plating solution permeates the sintered electrode layer in a step of forming the intermediate electroplated layer and the outside plated Sn layer.

In high-capacity monolithic ceramic capacitors including a large number of thin ceramic layers disposed between internal electrodes in particular, there is a problem in that after plated Sn layers are formed, the reliability is reduced during a high temperature loading test. This is probably because the sintered electrode layers are not completely covered with the intermediate electroplated layers made of Ni. That is, a plating solution for forming the plated Sn layers probably flows through crevices in the plated Ni layers to dissolve an oxide, such as glass, contained in the sintered electrode layers to permeate the sintered electrode layers to reach ceramic bodies. This causes a decrease in insulation resistance or the like.

In order to enhance solderability by completely covering the sintered electrode layers, which are included in external electrodes, with the plated Ni layers, various attempts have been made. For example, Patent Document 2 cited below discloses that fine particles derived from a glass frit contained in a conductive paste for forming a sintered electrode layer are prevented from adhering to the sintered electrode layer in such a manner that the sintered electrode layer is subjected to barrel-polishing. Since the resulting sintered electrode layer therefore has high surface smoothness, the sintered electrode layer can be satisfactorily covered with an intermediate electroplated layer.

Furthermore, the following technique has been proposed: a glass frit contained in a conductive paste for forming a sintered electrode layer is replaced with a conductive glass frit. A technique in which a plated Ni layer, which is an electroplated layer, is increased in thickness has been also proposed.

Patent Document 1: Japanese Unexamined Patent Application Publication No. 2002-75779
Patent Document 2: Japanese Unexamined Patent Application Publication No. 2003-117804

Even if barrel processing is performed as disclosed in Patent Document 2 such that the adhesion of the fine particles derived from the glass frit is prevented and the surface of the sintered electrode layer is smoothed, the insulation resistance is reduced due to the permeation of a plating solution for Sn plating during the deposition of an electroplated Ni layer and then a plated Sn layer on the sintered electrode layer. This is probably because even if the sintered electrode layer surface is smoothed by barrel polishing, bare oxides including the glass frit remain on the sintered electrode layer, the plating solution dissolves the oxides, pinholes are formed in surface portions of the sintered electrode layer from which the glass frit has been removed, and the plating solution flows through the pinholes during Sn plating.

In the technique in which the conductive glass frit is used instead of the above glass frit, although an electroplated Ni layer is deposited over regions exposed from the conductive glass frit, the thickness of the electroplated Ni layer is insufficient because the conductive glass frit is inferior in conductivity as compared to metal. Therefore, the insulation resistance is reduced due to the permeation of a plating solution for Sn plating when a high-temperature loading test is performed.

In the technique in which the electroplated Ni layer is increased in thickness, there is a problem in that the cost is high. Even if only the thickness of the electroplated Ni layer is increased, it is difficult to prevent a reduction in insulation resistance during the high-temperature loading test.

DISCLOSURE OF INVENTION

In order to overcome the problems associated with the known techniques, it is an object of the present invention to provide a monolithic ceramic electronic component having high reliability and a method for manufacturing such a monolithic ceramic electronic component. The monolithic ceramic electronic component includes external electrodes having a configuration in which an intermediate electroplated layer is disposed on a sintered electrode layer and a plated layer is disposed on the intermediate electroplated layer. The outer face of the sintered electrode layer is sufficiently covered with the intermediate electroplated layer; hence, the following problem hardly occurs: the insulation resistance and other properties of the monolithic ceramic electronic component are deteriorated by the permeation of a plating solution used to form the plated layer outside the intermediate electroplated layer.

A monolithic ceramic electronic component of the present invention includes a first external electrode, a second external electrode, and a monolithic ceramic element including an internal electrode, the first and second external electrodes being disposed on both end faces of the monolithic ceramic element. The external electrodes each include corresponding sintered electrode layers which are disposed on the monolithic ceramic element and which contain oxides, intermediate electroplated layers each disposed on the corresponding sintered electrode layers, and plated layers each disposed on the corresponding intermediate electroplated layers. The oxides are present in surface portions of the sintered electrode layers. The oxides have exposed surface regions exposed from the sintered electrode layers. The exposed surface regions have metals, disposed thereon, acting as seeds for forming the intermediate electroplated layers for covering the exposed surface regions.

In a specific aspect of the monolithic ceramic electronic component according to the present invention, the metals present between the exposed surface regions of the oxides and the intermediate electroplated layers have a hardness less than that of the oxides.

In another specific aspect of the monolithic ceramic electronic component according to the present invention, the ionization tendency of the metals present between the exposed surface regions of the oxides and the intermediate electroplated layers is lower than that of a metal contained in the intermediate electroplated layers.

The intermediate electroplated layers are preferably formed using plated Ni layers.

In another specific aspect of the monolithic ceramic electronic component according to the present invention, the metals present between the exposed surface regions of the oxides and the intermediate electroplated layers are made of Sn or a Sn alloy.

The present invention provides a method for manufacturing monolithic ceramic electronic component including a first external electrode, a second external electrode, and a monolithic ceramic element including an internal electrode extending to an end face thereof, the first and second external electrodes being disposed on both end faces of the monolithic ceramic element. The method includes a step of forming sintered electrode layers by attaching a conductive paste containing oxides to the monolithic ceramic element and then heat-treating the paste; a step of depositing metals on exposed surface regions of the oxides that are exposed from surface portions of the sintered electrode layers, the metals acting as seeds for forming intermediate electroplated layers for covering the exposed surface regions of the oxides; a step of forming the intermediate electroplated layers over the sintered electrode layers and the metals disposed on the exposed surface regions of the oxides by electroplating; and a step of forming plated layers on the outer faces of the intermediate electroplated layers.

In a specific aspect of the manufacturing method according to the present invention, in the step of depositing the metals which act as the seeds for forming the intermediate electroplated layers for covering the exposed surface regions of the oxides, the metals are deposited on the exposed surface regions of the oxides on the exposed surface of the sintered electrode layers in such a manner that the metals are transferred from media covered with the metals to the exposed surface regions of the oxides.

In another specific aspect of the manufacturing method according to the present invention, in the step of depositing the metals which act as the seeds for forming the intermediate electroplated layers for covering the exposed surface regions of the oxides, the metals present on media are deposited on the exposed surface regions of the oxides on the exposed surface portions of the sintered electrode layers in such a manner that the media covered with the metals with a hardness less than that of the oxides and the monolithic ceramic capacitor including the sintered electrode layers are placed into a vessel and then mixed.

In another specific aspect of the manufacturing method according to the present invention, in the step of depositing the metals which act as the seeds for forming the intermediate electroplated layers for covering the exposed surface regions of the oxides, the metals are deposited on the exposed surface regions of the oxides on the exposed surface portions of the sintered electrode layers in such a manner that media coated with a metal of which the ionization tendency is lower than that of a metal contained in the intermediate electroplated layers and the monolithic ceramic capacitor including the sintered electrode layers are placed into an electroplating system and the metal on the media is dissolved and then precipitated.

In the manufacturing method according to the present invention, the intermediate electroplated layers are preferably formed using plated Ni layers.

In another specific aspect of the manufacturing method according to the present invention, the metals deposited on the exposed surface regions of the oxides are made of Sn or a Sn alloy.

In the monolithic ceramic electronic component according to the present invention, the metals acting as the seeds for forming the intermediate electroplated layers for covering the exposed surface regions are present on the exposed surface regions of the oxides, which are contained in the sintered electrode layers and exposed from the surface portions of the sintered electrode layers. That is, the exposed surface regions of the oxides exposed from the surface portions of the sintered electrode layers are covered with the metals. Since the metals and conductive regions other than the exposed surface regions of the oxides are exposed, the intermediate electroplated layers with a sufficient thickness uniformly cover the outer faces of the sintered electrode layers if the intermediate electroplated layers are formed by electroplating. Therefore, when the plated layers are formed outside the intermediate electroplated layers, a plating solution can be prevented from permeating the sintered electrode layers. Hence, the monolithic ceramic electronic component of which the insulation resistance is hardly reduced during a high-temperature loading test and which has high reliability and desired properties can be provided.

Since the metals have a hardness less than that of the oxides, the metals can be physically attached to the exposed surface regions readily by mixing or the like.

Since the ionization tendency of the metals is lower than that of the metal contained in the intermediate electroplated layers, the metals can be deposited on the exposed surface regions of the oxides in such a manner that mild electrolysis is performed prior to the formation of the intermediate electroplated layers. Therefore, the step of depositing the metals on the exposed surface regions of the oxides can be performed using the plating system for forming the intermediate electroplated layers.

Since the intermediate electroplated layers are plated Ni layers, the sintered electrode layers are hardly oxidized when the plated layers, made of Sn or the Sn alloy, having good solderability are formed outside the intermediate electroplated layers. This is because the sintered electrode layers are covered with the plated Ni layers.

Since the metals present between the exposed surface regions of the oxides and the intermediate electroplated layers are made of Sn or the Sn alloy, the metals can be deposited on the exposed surface regions of the oxides in such a manner that the media coated with Sn or made of Sn are placed into a plating bath and mild electrolysis is performed prior to the formation of the intermediate electroplated layers. This is because the ionization tendency of Sn is lower than that of Ni.

In the method for manufacturing the monolithic ceramic electronic component according to the present invention, when the intermediate electroplated layers are formed, the metals acting as the seeds for forming the intermediate electroplated layers for covering the exposed surface regions of the oxides are deposited on the exposed surface regions of the oxides that are exposed from the surface portions of the sintered electrode layers. Since the intermediate electroplated layers are formed subsequently to the deposition of the metals, the intermediate electroplated layers properly cover the outer faces of the sintered electrode layers. Therefore, the insulation resistance of the monolithic ceramic electronic component according to the present invention is hardly reduced during the high-temperature loading test and the monolithic ceramic electronic component with high reliability can be provided.

In the manufacturing method according to the present invention, since the step of depositing the metals acting as the seeds is performed in such a manner that the metals are transferred from the media covered with the metals to the exposed surface regions of the oxides, the metals can be readily deposited on the exposed surface regions of the oxides by mixing the media and the monolithic ceramic element including no intermediate electroplated layers.

Since the media covered with the oxides having a hardness less than that of the oxides and the monolithic ceramic element including the sintered electrode layers are placed into the vessel and then mixed, the metals can be deposited on the exposed surface regions of the oxides readily and properly by mixing. This is because the hardness of the metals is less than that of the oxides.

Since the metals are deposited on the exposed surface regions of the oxides in such a manner that the media coated with the metal of which the ionization tendency is lower than that of the metal contained in the intermediate electroplated layers and the monolithic ceramic element including the sintered electrode layers are placed into the electroplating system and the metal on the media is dissolved and precipitated on the exposed surface regions of the oxides, the metals can be deposited on the exposed surface regions of the oxides using the electroplating system. Therefore, the electroplating system can be used in the subsequent step of forming the intermediate electroplated layers. Hence, the high-reliability monolithic ceramic electronic component according to the present invention can be efficiently manufactured without using an additional manufacturing system.

Since the intermediate electroplated layers are the plated Ni layer and the sintered electrode layers are covered with the intermediate electroplated layers, the sintered electrode layers can be securely prevented from being oxidized.

Since the metals deposited on the exposed surface regions of the oxides are made of Sn or the Sn alloy, the metals can be deposited on the exposed surface regions of the oxides in such a manner that the media coated with Sn or made of Sn are placed into the plating bath and mild electrolysis is performed prior to the formation of the intermediate electroplated layers such that Sn is precipitated. This is because the ionization tendency of Sn is lower than that of Ni.

BRIEF DESCRIPTION OF THE DRAWINGS

FIG. 1(a) is a front sectional view of a monolithic ceramic electronic component according to an embodiment of the present invention, the component being a monolithic ceramic capacitor, and FIG. 1(b) is a fragmentary front sectional view showing a substantial part of an external electrode in an enlarged manner.

Figure 2:
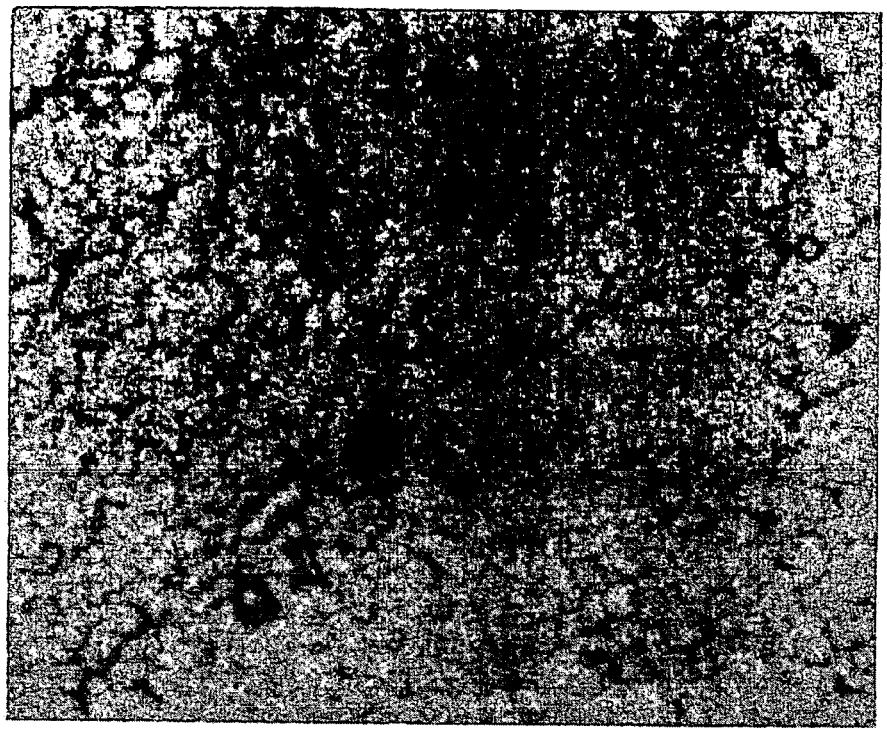
FIG. 2 is a scanning electron microscope photograph of a surface portion of an electrode, prepared in a comparative example without performing pretreatment for deposition, including an intermediate electroplated layer made of Ni.

REFERENCE NUMERALS 1 monolithic ceramic capacitor
2 and 3 internal electrodes
4 ceramic sintered compact
4a and 4b end faces
5 and 6 external electrodes
5a and 6a sintered electrode layers
5b and 6b intermediate electroplated layers
5c and 6c plated layers
7 oxides
7a exposed surface regions

BEST MODE FOR CARRYING OUT THE INVENTION

Embodiments and examples of the present invention will now be described in detail with reference to the accompanying drawings, whereby the present invention will become apparent.

FIG. 1(a) is a front sectional view of a monolithic ceramic electronic component according to an embodiment of the present invention and FIG. 1(b) is a fragmentary front sectional view showing a substantial part of an external electrode in an enlarged manner. The monolithic ceramic electronic component of this embodiment is a monolithic ceramic capacitor 1. The monolithic ceramic capacitor 1 includes a ceramic sintered compact 4, which is a monolithic ceramic element, including ceramic layers and a plurality of internal electrodes 2 and 3 each disposed therebetween. The internal electrodes 2 extend to one end face 4a of the ceramic sintered compact 4. The internal electrodes 3 extend to the other end face 4b of the ceramic sintered compact 4. The end faces 4a and 4b are covered with a first external electrode 5 and a second external electrode 6, respectively. The first and second external electrodes 5 and 6 include a sintered electrode layer 5a and a sintered electrode layer 6a, respectively, disposed on the end faces 4a and 4b, respectively, of the ceramic sintered compact 4, that is, a ceramic element. The sintered electrode layers 5a and 6a are formed by baking a conductive paste containing an oxide such as a glass frit.

An intermediate electroplated layer 5b and intermediate electroplated layer 6b formed by an electroplating process are disposed on the sintered electrode layers 5a and 6a, respectively. In this embodiment, the intermediate electroplated layers 5b and 6b are formed by Ni electroplating.

A plated layer 5c and an plated layer 6c are disposed on the intermediate electroplated layers 5b and 6b, respectively. In this embodiment, the plated layers 5c and 6c are formed by Sn electroplating. The plated layers 5c and 6c made of Sn are arranged to enhance the solderability. The intermediate electroplated layers 5b and 6b are made of Ni and arranged such that the sintered electrode layers 5a and 6a disposed thereunder are prevented from being oxidized and a plating solution is prevented from permeating the sintered electrode layers 5a and 6a during Sn plating.

For this type of external electrode, there is a problem in that any sintered electrode layer cannot be sufficiently covered with an intermediate electroplated layer when an outer plated layer made of Sn is formed by electroplating.

In contrast, for the monolithic ceramic capacitor 1 of this embodiment, in order to solve such a problem, metals 8 are deposited such that exposed surface regions 7a of oxides 7 contained in the sintered electrode layer 5a are covered with the metals 8 as shown in FIG. 1(b), which shows the substantial part of the external electrode 5 in an enlarged manner, the exposed surface regions 7a being exposed from the sintered electrode layer 5a.

The sintered electrode layer 5a is formed by baking the conductive paste that contains the glass frit containing an oxide such as $SiO_2$ and also contains conductive powder made of Ag or Cu. The sintered electrode layer 5a formed as described above contains the oxides 7. As shown in FIG. 1(b), oxide particles are dispersed such that some of the particles are partly exposed from the sintered electrode layer 5a. The oxides 7 are made of an insulating material such as $SiO_2$. Therefore, since the exposed surface regions 7a of the oxides 7 arranged in the outer face of the sintered electrode layer 5a are insulative or have low conductivity, surface portions of the first external electrode 5 are insulative or have low conductivity.

Even if the intermediate electroplated layer 5b is formed on the first external electrode 5 by Ni electroplating, any Ni coating can hardly be deposited over the exposed surface regions 7a of the oxides 7 satisfactorily.

However, in the monolithic ceramic capacitor 1 of this embodiment, the metals 8 are deposited such that the exposed surface regions 7a of the oxides 7 are partly covered with the metals 8. Therefore, during Ni electroplating, Ni is deposited on the metals 8 acting as seeds. Ni is properly deposited over the conductive surface portions of the first external electrode 5 and the metals 8 disposed on the exposed surface regions 7a of the oxides 7 by electroplating, whereby the intermediate electroplated layer 5b with good coverage is formed.

If the plated layer 5c, made of Sn, for enhancing solderability is formed by a wet plating process such as an electroplating process, the plating solution hardly permeates the sintered electrode layer 5a because the outer face of the sintered electrode layer 5a is properly covered with the intermediate electroplated layer 5b. This provides the monolithic ceramic capacitor 1 of which the insulation resistance is hardly reduced during a high-temperature loading test and which therefore has high reliability.

The sintered electrode layers 5a and 6a are not particularly limited except that the sintered electrode layers 5a and 6a are formed by baking any conductive paste containing appropriate conductive powder and insulating oxide particles. The metals 8 are not particularly limited except that the metals 8 are deposited such that the exposed surface regions 7a of the oxides 7 are covered with the metals 8.

The metals 8 are preferably made of a metal of which the ionization tendency is lower than that of a metal contained in the intermediate electroplated layer 5b. When the intermediate electroplated layer 5b is made of Ni, the following metal of which the ionization tendency is lower than that of Ni or the following alloy can be used: Sn, Cu, Ag, Au, Pt or alloy principally containing such a metal.

Since the metals 8 contain the metal of which the ionization tendency is lower than that of the metal contained in the intermediate electroplated layers, ions of the metal which is present in a plating bath and which is contained in the metals 8 can be precipitated in such a manner that before electroplating is performed to form the intermediate electroplated layers, media coated with the metal for forming the metals 8 or media made of the metal are immersed in the plating bath and mild electrolysis is then performed under conditions milder than those of electroplating, whereby the metals 8 can be deposited on the exposed surface regions of the oxides. That is, the metals 8 can be deposited on the exposed surface regions 7a of the oxides 7 using a plating system necessary to form the intermediate electroplated layers. When the metal ions for forming the metals 8 are present in the plating bath as described above, the metals can be deposited on the exposed surface regions 7a of the oxides by performing mild electrolysis prior to electroplating.

The metal contained in the metals 8 preferably has a hardness less than that of the oxides 7. When the metals 8 have a hardness less than that of the oxides 7, the metals 8 can be physically attached to the exposed surface regions 7a of the oxides 7 present in the surface portions of the first external electrode 5 in such a manner that the monolithic ceramic capacitor 1 including the sintered electrode layers 5a and 6a is mixed with media covered with the metals 8 by barrel polishing such that the metals 8 are scraped off. In a plating system, the metals present on the media can be physically attached to surfaces of the oxides present in the surface portions of the sintered electrode layers by performing mixing prior to electrolysis in the same manner as described above.

The metal material for forming the intermediate electroplated layers 5b and 6b is not particularly limited. In the present invention, in order to prevent the oxidation of the sintered electrode layers 5a and 6a and in order to securely prevent the permeation of a plating solution, Ni is preferably used.

Examples of a material for forming the metals 8 include Sn, Cu, Ag, Au, Pb or alloy containing such a metal, the ionization tendency of this metal or alloy being lower than that of Ni. This metal or alloy, of which the ionization tendency is lower than that of the metal contained in the intermediate electroplated layers 5b and 6b, can be deposited on portions of the sintered electrode layers and the exposed surface regions of the oxides in such a manner that mild electrolysis is performed prior to the formation of the intermediate electroplated layers 5b and 6b, because the ionization tendency of this metal is lower than that of that metal present in the plating solution for forming the intermediate electroplated layers and this metal is therefore precipitated prior to that metal.

Examples of the metal for forming the metals 8 include Sn, Cu, Ag, Au, Zn, Bi, Pb, or alloy containing such a metal, the hardness of the metal or alloy being less than that of the oxides. This metal or alloy of which the hardness is less than that of that metal contained in the intermediate electroplated layers 5b and 6b can be deposited on the exposed surface regions of the oxides because this metal or alloy is scraped off with the oxide such as a glass frit prior to the formation of the intermediate electroplated layers 5b and 6b during barrel polishing or mixing before plating.

Among the above types of metal, Sn or a Sn alloy is preferable because Cu is readily oxidized, Ag and Au are relatively expensive, and the ionization tendency and hardness of Sn and the Sn alloy are lower than those of Ni.

A method for manufacturing the monolithic ceramic capacitor 1 will now be described in detail.

In order to obtain the monolithic ceramic capacitor 1, the ceramic sintered compact 4 including the internal electrodes 2 and 3 is prepared by a known process. A conductive paste is applied onto the end faces 4a and 4b of the ceramic sintered compact 4 and then baked, whereby the sintered electrode layers 5a and 6b are formed.

The sintered electrode layers 5a and 6a contain the oxides 7, which are partly exposed from the outer faces of the sintered electrode layers 5a and 6a. That is, there are the exposed surface regions 7a shown in FIG. 1(b).

The metals 8 are deposited such that the exposed surface regions 7a of the oxides 7 exposed from the sintered electrode layers 5a and 6a included in the monolithic ceramic capacitor 1 are partly covered with the metals 8. In order to deposit the metals 8 on the exposed surface regions 7a of the oxides 7, the monolithic ceramic capacitor 1 and media made of the same metal material as that for forming the metals 8 or spherical steel balls coated with the same metal material as that for forming the metals 8 are placed into a vessel and then mixed. Alternatively, the metals 8 can be deposited on the exposed surface regions 7a of the oxides 7 in such a manner that the media and the monolithic ceramic capacitor 1 are placed into a barrel included in a rotary barrel plating system and mild electrolysis is then performed as described above. In the method in which the barrel plating system is used and the metals 8 are deposited by the mild electrolysis, no additional system for the deposition of the metals 8 is necessary. Barreling may be performed immediately after the deposition of the metals 8 and the intermediate electroplated systems 5a and 6b may be then formed by electroplating. This leads to an increase in the production of the monolithic ceramic capacitor 1.

The method for depositing the metals 8 on the exposed surface regions 7a of the oxides 7 is not limited to these methods and another method such as a method for spraying the metals 8 may be used.

A first experiment will now be described.

Monolithic ceramic capacitors were prepared using ceramic sintered compacts 4 having a length of 2.0 mm, a width of 1.2 mm, and a height of 1.2 mm. The monolithic ceramic capacitors had a capacitance of 10 µF, a rated voltage of 6.3 V, and B-type temperature characteristics.

The ceramic sintered compacts 4 were made of $BaTiO_3$ ceramic and included 300 stacked internal electrodes. A conductive paste containing conductive powder made of Cu and oxides made of borosilicate glass was applied onto the ceramic sintered compacts 4 and then baked, whereby sintered electrode layers 5a and 6a were formed. Regions of the sintered electrode layers 5a and 6a that were located on end faces 4a and 4b had a thickness of 50 µm. The oxides had a particle size of 2 to 3 µm.

The surfaces of the sintered electrode layers 5a and 6a prepared as described above were observed with a scanning electron microscope. The observation showed that the oxide particles were partly exposed.

Fifty thousand chips including the sintered electrode layers 5a and 6a and two hundred thousand of first, second, or third media described below were placed into a barrel and intermediate electroplated layers made of Ni were formed.

Details of the first to third media are as described below.

First media: Steel balls having a diameter of 1.6 mm

Second media: Steel balls, each covered with a Sn layer with a thickness of 10 µm, having a diameter of 1.6 mm Third media: Steel balls, made of Sn, having a diameter of 1.6 mm Metal deposition that was a pretreatment prior to plating was performed in such a manner that the chips and the media were placed into the barrel, which was then rotated in water at a rotation speed of 5 to 30 rpm for 10 to 30 minutes. The resulting barrel was immersed in a Ni plating bath and Ni electroplating was then performed with a current of 30 A for 60 minutes. As shown in Table 1, in a comparative example, intermediate electroplated layers were formed without performing the metal deposition, which was the pretreatment.

After the intermediate electroplated layers were formed as described above, Sn electroplating was performed with a current of 15 A for 60 minutes, whereby plated layers 5c and 6c were formed.

As shown in Table 1, various monolithic ceramic capacitors were prepared by varying the rotation speed and rotation time of the barrel for the metal deposition, that is, the deposition of metals 8. The monolithic ceramic capacitors prepared as described above were subjected to a high-temperature loading test by a procedure described below.

High-temperature loading test: a direct voltage of 10 V was applied to the monolithic ceramic capacitors 1 at 105° C. for 1000 hours. After 1000 hours elapsed, any monolithic ceramic capacitors 1 having an insulation resistance of 100 MΩ were determined to be defective. The initial insulation resistance was designed to be 1000 MΩ.

Table 1 shows the number of defective capacitors per 100 of the monolithic ceramic capacitors subjected to the high-temperature loading test.

TABLE 1

| Media | Metal Deposition | | Number of Defective Capacitors in High-temperature Load Test (number/100 capacitors) |
|---|---|---|---|
| | Rotation Speed of Barrel (rpm) | Time (minutes) | |
| Comparative Example | none | — | 12 |
| (1) | 30 | 10 | 15 |
| (1) | 30 | 20 | 9 |
| (1) | 30 | 30 | 13 |
| (2) | 5 | 10 | 11 |
| (2) | 5 | 20 | 3 |
| (2) | 5 | 30 | 0 |
| (2) | 10 | 10 | 5 |
| (2) | 10 | 20 | 0 |
| (2) | 10 | 30 | 0 |
| (2) | 20 | 10 | 0 |
| (2) | 20 | 20 | 0 |
| (2) | 20 | 30 | 0 |
| (2) | 30 | 10 | 0 |
| (2) | 30 | 20 | 0 |
| (2) | 30 | 30 | 0 |
| (3) | 5 | 10 | 18 |
| (3) | 5 | 20 | 2 |
| (3) | 5 | 30 | 0 |
| (3) | 10 | 10 | 6 |
| (3) | 10 | 20 | 0 |
| (3) | 10 | 30 | 0 |
| (3) | 20 | 10 | 0 |
| (3) | 20 | 20 | 0 |
| (3) | 20 | 30 | 0 |
| (3) | 30 | 10 | 0 |
| (3) | 30 | 20 | 0 |
| (3) | 30 | 30 | 0 |

(1), (2), and (3) represent first media, second media, and third media, respectively.

As is clear from Table 1, in the comparative example in which the metal deposition was not performed prior to plating, the number of the capacitors determined to be defective by the high-temperature loading test is large. For the capacitors made by using the first media, that is, the steel balls with a diameter of 1.6 mm, the number of the capacitors determined to be defective by the high-temperature loading test is also large. This is probably because the metals were not deposited on the oxides.

In contrast, for the capacitors made by using the second media, that is, the steel balls coated with Sn, the number of capacitors determined to be defective by the high-temperature loading test is zero when the rotation speed and rotation time of the barrel is sufficiently large. For the capacitors made by using the third media made of Sn, the number of capacitors determined to be defective by the high-temperature loading test is zero when the rotation speed and rotation time of the barrel is sufficiently large. This is probably because since the second media coated with Sn or the third media made of Sn are used, Sn is deposited such that the exposed surface regions 7a of the oxides 7 which are exposed from the sintered electrode layers 5a and 6a are sufficiently covered with Sn and Ni for forming the intermediate electroplated layers is therefore properly deposited over the metals 8 present on the exposed surface regions 7a of the oxides 7, whereby the intermediate electroplated layers 5b and 6b having good coverage are formed. As is clear from Table 1, in particular, for the capacitors made by using the second or third media, the number of capacitors determined to be defective by the high-temperature loading test is zero when the product of the rotation speed (rpm) of the barrel multiplied by the rotation time (minutes) thereof is 150 or more. Accordingly, the product of the rotation speed (rpm) of the barrel multiplied by the rotation time (minutes) thereof is preferably 150 or more.

Figure 3:
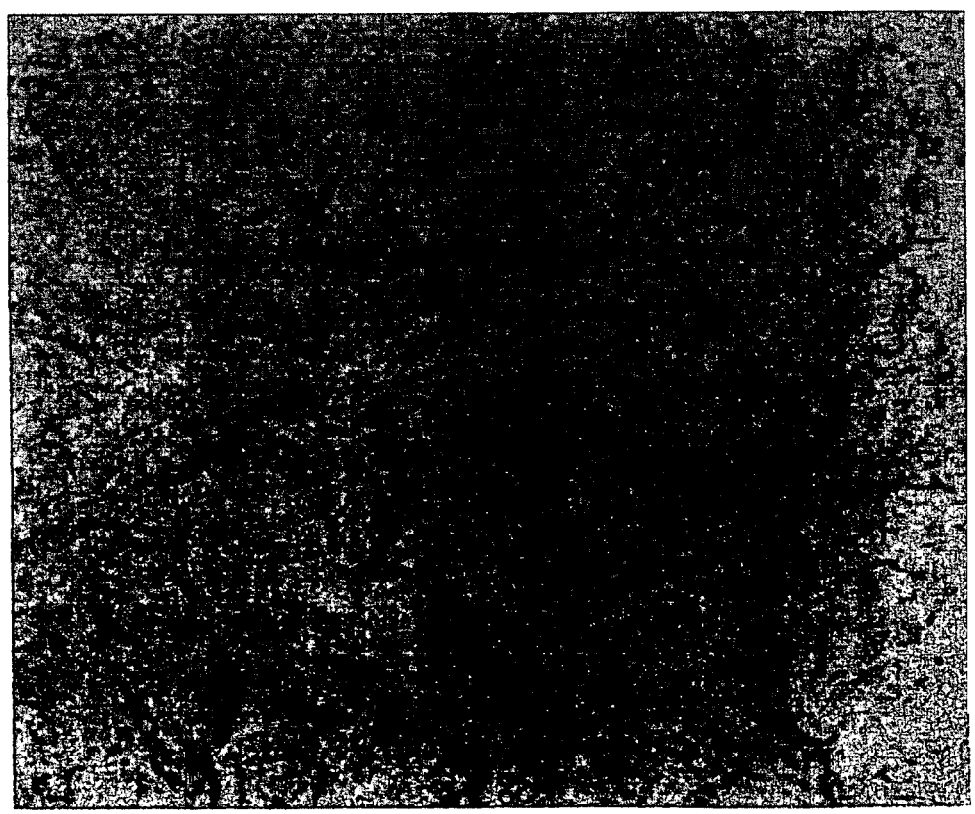
FIG. 3 is a scanning electron microscope photograph of a surface of an electrode prepared in an experiment that is an example of the present invention in such a manner that metals are deposited on exposed surface regions of oxides in a pretreatment step and intermediate electroplated layers are then formed.

FIG. 2 is a scanning electron microscope photograph of an electrode of a capacitor prepared in Comparative Example 1, including an intermediate electroplated layer, that is, a plated Ni layer, formed without performing the pretreatment. FIG. 3 is a scanning electron microscope photograph of an intermediate electroplated layer formed in such a manner that the pretreatment is performed at a rotation speed of 5 rpm for 30 minutes using the third media and an intermediate electroplated layer, that is, a plated Ni layer, is then formed. As is clear from the comparison between FIGS. 2 and 3, FIG. 2 shows a large number of black spots, probably derived from the glass frit, present in a white area showing the plated Ni layer but FIG. 3 shows substantially no black spots probably derived from the glass frit.

Accordingly, it is clear that an intermediate electroplated layer made of Ni can be formed by performing the pretreatment such that the intermediate electroplated layer sufficiently covers a sintered electrode layer.

A second experiment will now be described.

Ceramic sintered compacts that are the same as those used in the first experiment were prepared. Pretreatment was performed prior to the formation of intermediate electroplated layers made of Ni in such a manner that fifty thousand of the ceramic sintered compacts and two hundred thousand of media of tin-containing steel balls with a diameter of 1.6 mm were placed into a rotary barrel (a rotation speed of 10 rpm) and a current of 3, 6, 9 or 12 A was applied to a Ni plating bath for one, three, five, or seven minutes just before plating while the barrel immersed in the Ni plating bath was being rotated. The pretreatment is mild electrolysis that is performed for a relative short time using a current less than that used in Ni plating. The pretreatment probably ensures that Sn dissolved from the media in the plating bath is deposited on sintered electrode layers.

A current of 30 A was applied to the Ni plating bath for 60 minutes subsequently to the pretreatment, whereby the intermediate electroplated layers made of Ni were formed. The barrel was then immersed in a Sn plating bath and a current of 15 A was applied to the Sn plating bath for 60 minutes, whereby plated Sn layers were formed.

The monolithic ceramic capacitors prepared as described above were subjected to the same high-temperature loading test as that described in the first experiment, whereby the number of defective capacitors per 100 of the monolithic ceramic capacitors was determined. Table 2 shows the experiment results. In Table 2, the current is the current flowing during the mild electrolysis, which is the pretreatment performed prior to the formation of the plated Ni layers, and the current application time is a time in which a current flows during the electrolysis.

TABLE 2

| Conditions of Mild Electrolysis | | |
| --- | --- | --- |
| Current (A) | Current Application Time (minutes) | Number of Defective Capacitors in High-temperature Load Test (number/100 capacitors) |
| 0 | — | 12 |
| 3 | 1 | 8 |
| 3 | 3 | 5 |
| 3 | 5 | 0 |
| 3 | 7 | 0 |
| 6 | 1 | 3 |
| 6 | 3 | 2 |
| 6 | 5 | 0 |
| 6 | 7 | 0 |
| 9 | 1 | 5 |
| 9 | 3 | 3 |
| 9 | 5 | 4 |
| 9 | 7 | 2 |
| 12 | 1 | 8 |
| 12 | 3 | 7 |
| 12 | 5 | 5 |
| 12 | 7 | 7 |

As is clear from Table 2, the monolithic ceramic capacitors prepared by performing the mild electrolysis have higher reliability as compared to the monolithic ceramic capacitors prepared without performing the mild electrolysis, that is, the monolithic ceramic capacitors prepared in a conventional example in which the current is zero as shown in Table 2. In particular, when the current flowing during the mild electrolysis is 6 A or less, that is, when the current flowing during the mild electrolysis is one fifth or less of a current flowing during the formation of the plated Ni layers, the number of capacitors determined to be defective by the high-temperature loading test is very small. Hence, this condition is significantly effective.

As described above, the high-temperature load reliability is enhanced by the mild electrolysis in which a weak current is applied to the Ni plating bath for a relatively short time. This is probably because Sn contained in the medium is dissolved by the bipolar phenomenon and deposited at the surface of the sintered electrode layers and deposited on the exposed surface regions of the oxides. As is clear from Table 2, the metals may be deposited on the exposed surface regions of the oxides by the mild electrolysis.

In the mild electrolysis, Sn ions are chemically deposited depending on the difference in ionization tendency between Sn and Ni. Therefore, Sn is deposited on the non-conductive glass frit, that is, the oxide surface. In this way, Sn is deposited on the exposed surface regions of the oxides that are non-conductive or slightly conductive. In subsequent Ni plating, the dense plated Ni layers are continuously formed on the Sn-layers. This leads to the enhancement of the coverage of the intermediate electroplated layers made of Ni; hence, the plating solution used in subsequent Sn plating can be securely prevented from passing through the plated Ni layers. The reason why an increase in the current flowing during the mild electrolysis reduces the effect thereof is probably that Ni is deposited prior to the deposition of Sn ions.

The present invention is as described above with reference to the first and second experiments for preparing the monolithic ceramic capacitors and is applicable to various monolithic ceramic electronic components including external electrodes disposed on both end faces thereof.

In a monolithic ceramic electronic component according to the present invention, a monolithic ceramic element may include at least one internal electrode and need not necessarily include a plurality of internal electrodes.

The invention claimed is:

1. A monolithic ceramic electronic component comprising a first external electrode, a second external electrode, and a monolithic ceramic element including an internal electrode, the first and second external electrodes being disposed on both end faces of the monolithic ceramic element, wherein each external electrode comprises a sintered electrode layer disposed on the monolithic ceramic element and which has oxides exposed at surface portions of the sintered electrode distant from the ceramic element, an intermediate electroplated layer disposed on the sintered electrode layer, and a plated layer disposed on the intermediate electroplated layer; and wherein the exposed oxide surface has a metal disposed thereon, the metal being an electroplating seed for forming the intermediate electroplated layers.

2. The monolithic ceramic electronic component according to claim 1, wherein the seed metal has a hardness less than that of the oxides.

3. The monolithic ceramic electronic component according to claim 2, wherein the ionization tendency of the seed metal is lower than that of a metal contained in the intermediate electroplated layer.

4. The monolithic ceramic electronic component according to claim 2, wherein the intermediate electroplated layer comprises plated Ni.

5. The monolithic ceramic electronic component according to claim 2, wherein the seed metal comprises Sn or a Sn alloy.

6. The monolithic ceramic electronic component according to claim 1, wherein the ionization tendency of the seed metal is lower than that of a metal contained in the intermediate electroplated layers.

7. The monolithic ceramic capacitor-manufacturing method according to claim 6, wherein the intermediate electroplated layers are plated Ni layers.

8. The monolithic ceramic capacitor-manufacturing method according to claim 6, wherein the seed metal comprises Sn or a Sn alloy.

9. The monolithic ceramic capacitor-manufacturing method according to claim 8, wherein the intermediate electroplated layer is formed on the sintered electrode layer by electroplating in a composition comprising Ni; and the plated layer is formed by plating a composition comprising tin on the intermediate electroplated layer.

10. The monolithic ceramic capacitor-manufacturing method according to claim 9, wherein the seed metal is deposited by barrel plating the sintered monolithic capacitor with media having the seed metal on the surface thereof at a time and rotational speed such that the product of the time in minutes and speed in rpm is at least 150.

11. A method for manufacturing monolithic ceramic electronic component including a first external electrode, a second external electrode, and a monolithic ceramic element including an internal electrode extending to an end face thereof, the first and second external electrodes being disposed on different end faces of the monolithic ceramic element, the method comprising forming the first and second external electrodes by:

providing a conductive paste containing oxides on separated surfaces of the monolithic ceramic element and then heat-treating the paste;

depositing metal on surface regions of the oxides that are exposed from surface portions of the sintered electrode layer, the metal being an electroplating seed for forming an intermediate electroplated layer covering the exposed surface regions of the oxides;

forming the intermediate electroplated layer on the sintered electrode layer and the seed metals disposed on the exposed surface regions of the oxides by electroplating; and forming a plated layer on the intermediate electroplated layer.

12. The monolithic ceramic capacitor-manufacturing method according to claim 11, wherein the seed metal is deposited on the exposed surface regions of the oxides from media covered with the metal.

13. The monolithic ceramic capacitor-manufacturing method according to claim 12, wherein the seed metal has a hardness less than that of the oxides and wherein the monolithic ceramic capacitor having the sintered electrode layers thereon and the media are placed into a vessel and then mixed.

14. The monolithic ceramic capacitor-manufacturing method according to claim 13, wherein the seed metal has an ionization tendency which is lower than that of a metal contained in the intermediate electroplated layers and wherein the monolithic ceramic capacitor having the sintered electrode layers and media are placed into an electroplating system in which the metal on the media is dissolved and then precipitated.

15. The monolithic ceramic capacitor-manufacturing method according to claim 12, wherein the plated layers are formed by electroplating and the seed metal is deposited by electrolysis at a current which is one-fifth or less of the current employed in the plated layer electroplating.

16. The monolithic ceramic electronic component according to claim 11, wherein the intermediate electroplated layer is a plated Ni layer.

17. The monolithic ceramic electronic component according to claim 11, wherein the seed metal comprises Sn or a Sn alloy.

18. The monolithic ceramic electronic component according to claim 17, wherein intermediate electroplated layers comprise Ni and the plated layers comprise tin.

* * * * *